United States Patent [19]
Breeden

[11] Patent Number: 5,485,715
[45] Date of Patent: Jan. 23, 1996

[54] GRASS AND LEAF ERADICATOR

[76] Inventor: Harlan Breeden, 4119 Leonard Springs Rd., Bloomington, Ind. 47403

[21] Appl. No.: 338,035

[22] Filed: Nov. 14, 1994

[51] Int. Cl.⁶ ..................................................... A01D 34/82
[52] U.S. Cl. ............................. 56/13.3; 56/14.5; 56/16.4 A
[58] Field of Search ........................... 56/16.4 A, 16.9, 56/13.3, 14.5, 320.2; 460/111, 112

[56] References Cited

U.S. PATENT DOCUMENTS

| 3,974,629 | 8/1976 | Russell et al. | 56/320.2 X |
| 4,263,771 | 4/1981 | Iaboni et al. | 56/13.4 |
| 4,287,708 | 9/1981 | Neely, Jr. | 56/13.5 |
| 4,916,887 | 4/1990 | Mullet et al. | 56/13.8 |
| 5,070,683 | 12/1991 | Eggenmueller | 56/13.8 |
| 5,142,851 | 9/1992 | Lydy et al. | 56/13.4 |

*Primary Examiner*—George A. Suchfield
*Attorney, Agent, or Firm*—Woodard, Emhardt, Naughton, Moriarty & McNett

[57] ABSTRACT

A mulcher for grass and leaves utilizing a hammer mill to finely shear the clippings from a riding lawn mower, into a mulch. Grass is fed from the mower-deck of a lawn mower into a centrifugal fan containing a paddle-wheel style impeller. The clippings pass through the rotating impeller, and then are blown into a hammer mill where they are finely chopped before being deposited upon the ground. The hammer mill and blower are powered by a motor or a gear box mechanically connected to the power take-off of a tractor.

19 Claims, 5 Drawing Sheets

GRASS AND LEAF ERADICATOR

BACKGROUND OF THE INVENTION

This invention relates to a method and apparatus for mulching grass, leafage, or similar material, and more particularly to mulching apparatuses and methods that utilize a hammer mill.

U.S. Pat. No. 4,263,771 to Iaboni et al. describes a mulching mower adapted to cut and finely mulch grass, leaves and the like. The device comprises a first blade to cut grass and a second blade, on the same shaft but in a separate housing, to finely cut the grass into mulch before exiting the device.

U.S. Pat. No. 4,916,887 to Mullet et al. describes a mulcher that mounts onto a tractor and is characterized as a single housing with two or more rotatably journaled cutting blades and a plurality of high speed mulching blades mounted downstream of the cutting blades.

U.S. Pat. No. 5,070,683 to Eggenmueller describes a mulcher with rotating knives mounted within the same housing as the mower's cutting blade, where both are powered by the same engine.

U.S. Pat. No. 5,142,851 to Lydy et al. describes a post-processing mulcher mounted on the discharge of a lawn mower. The post processor comprises a rotating blade to finely cut materials and an impeller to pull these materials past the blade and out the device.

All the foregoing devices can become impeded or even stuck with heavy loads of materials passing through them, especially materials containing large amounts of leaves or sticks mixed with the grass. Furthermore, it is questionable to what extent these devices can finely divide this yard refuse into an acceptable mulch. What is needed is a device that can readily handle large amounts of cuttings from a mower-deck and not bog down nor stall. Furthermore, what is needed is a device that can readily pulverize these materials routinely into a mulch of such a fine particle size that it settles down between the cut grass blades and quickly decomposes.

SUMMARY OF THE INVENTION

It has been discovered that a hammer mill, commonly used to pulverize chunks of material into powders, such as coal or even pharmaceuticals, can be used to pulverize leafage such as grass, leaves, sticks, or the like emitted from a riding lawn mower.

Accordingly in one aspect, this invention is a mulcher for a tractor with a mower-deck or a riding lawn mower where the mulcher includes a blower and a hammer mill to process the cuttings. An inlet duct attaches to the discharge of a mower-deck from a tractor or a riding lawn mower and carries the clippings into the blower. The blower then conveys these clippings through an interconnecting duct and into a hammer mill, located downstream of the blower. Partially the blower, then mostly the hammer mill, finely cut and chop sticks, leaves, and grass clippings as well as other debris into a finely divided mulch which is deposited upon the ground behind the tractor or lawn mower. A motor or a gearbox mechanically connected to a power take-off from the tractor provides the necessary power to operate both the blower and the hammer mill of this invention.

In another aspect of this invention, an apparatus for preparing mulch is provided. The apparatus includes a tractor having an open-bottom housing with at least one cutting blade rotatably mounted inside the housing. The apparatus further includes a blower and a hammer mill. Grass, leaves, or stick clippings cut by the rotatably mounted blade are discharged from the housing and vacuumed into the inlet of the blower. The blower then feeds the clippings through an interconnecting duct into a hammer mill, located downstream of the blower. Partially the blower, then mostly the hammer mill, finely chop the grass, leaves, sticks, and other debris into a finely divided mulch which is deposited upon the ground behind the apparatus. At least one motor or a gearbox mechanically connected to a power take-off from the tractor provides power to operate both the blower and the hammer mill.

In still another aspect of this invention, a method for preparing a mulch is provided. This method for preparing a mulch includes the steps of: cutting the grass, leaves, sticks or similar debris with a lawn mower, directing the clippings from the discharge of the lawn mower into the inlet of a blower, blowing the clippings from the blower into the entrance of a hammer mill, shearing the clippings into a mulch with the hammer mill, and discharging the mulch from the hammer mill.

An object of this invention is to provide an environmentally systematic method for eradicating grass, leaves, sticks and other debris utilizing the grinding capabilities of a hammer mill.

A feature of this invention is that it can be operated with a device having a mower-deck that was not previously designed to prepare a mulch.

Another feature of this invention is that the hammer mill can have various sizes to accommodate any size of mower deck and feed rates of clippings.

An advantage of this invention is that is eliminates the handling and disposing of grass, leaves, sticks, and other debris encountered in yard or lawn maintenance. This can be a huge cost saving measure for cities, parks, and recreation areas.

DESCRIPTION OF THE DRAWINGS

In the accompanying drawings, forming a part of this specification, and in which like numerals are employed to designate like parts throughout the specification.

DESCRIPTION OF THE PREFERRED EMBODIMENTS

Specific language is used to describe several preferred embodiments of the present invention for the purpose of promoting an understanding of the principles of the invention. It should be understood that no limitation of the scope of this invention is intended by using this specific language. Any alteration or modification of the apparatus or method described within this specification, or any application of the principles this invention are contemplated that normally occur to one skilled in this art.

Figure 1:
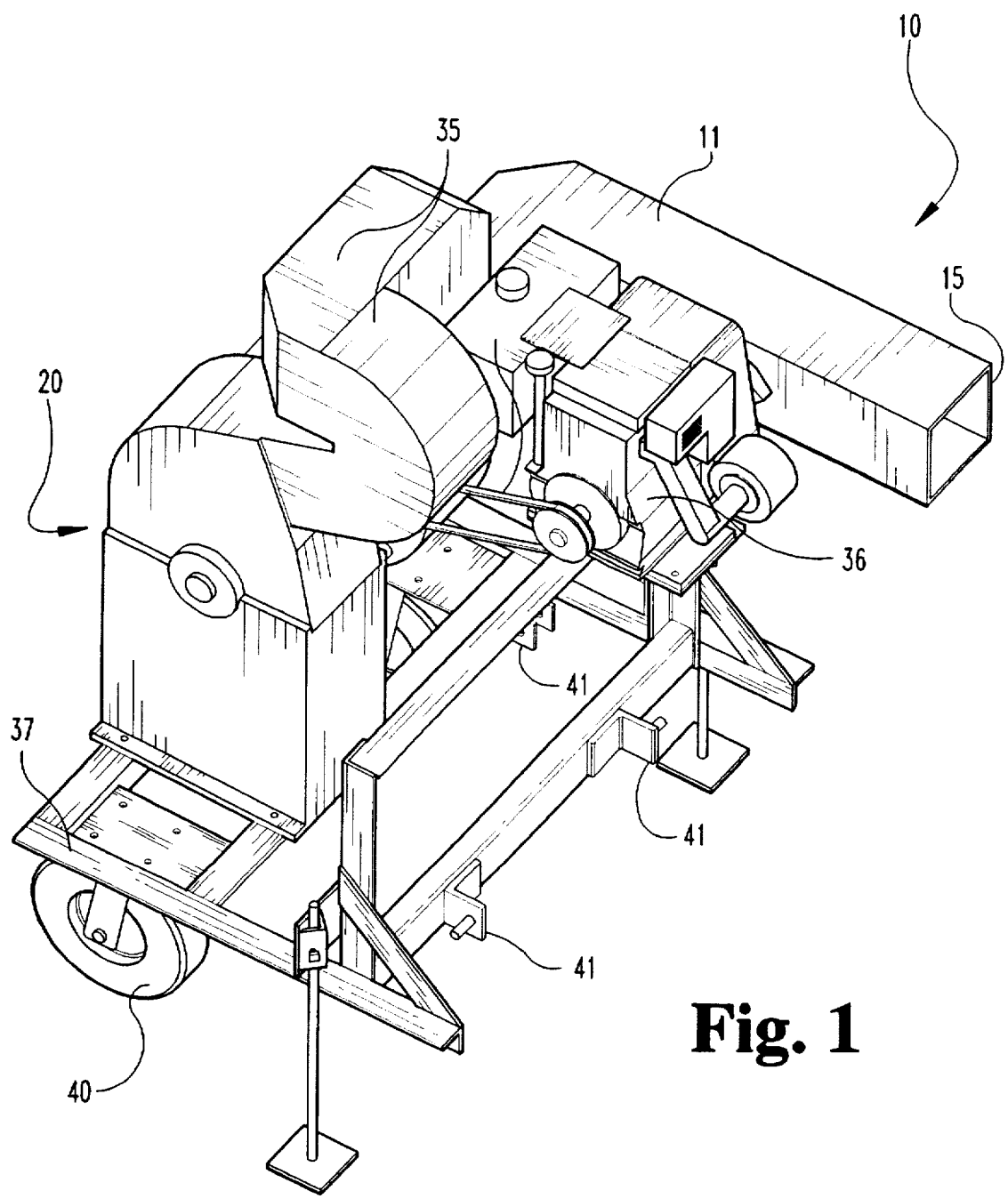
FIG. 1 is a perspective view of an apparatus for preparing mulch in one preferred embodiment of the invention.

Referring to FIG. 1, there is shown an apparatus 10 for preparing mulch from grass, leaves, sticks, or similar debris; and for pulling behind a riding mower or a tractor with a mower-deck. The apparatus 10 includes an inlet duct 11. The inlet duct 11 is designed to accept a discharge of clippings from the mower-deck of a tractor or a riding lawn mower. Typically, a chute or flexible hose interconnects the discharge of the mower-deck to the entrance 15 of the inlet duct 11, and preferably a six inch diameter vacuum hose (not shown) is used to accomplish this. The inlet duct 11 is shown with a rectangular cross-section; however, other cross-sectional shapes are contemplated such as round or oval. The inlet duct accepts clippings from the discharge of the mower deck and directs them into a blower 16 (FIG. 2), assisted by the vacuum produced at the inlet 17 of the blower.

Figure 3:
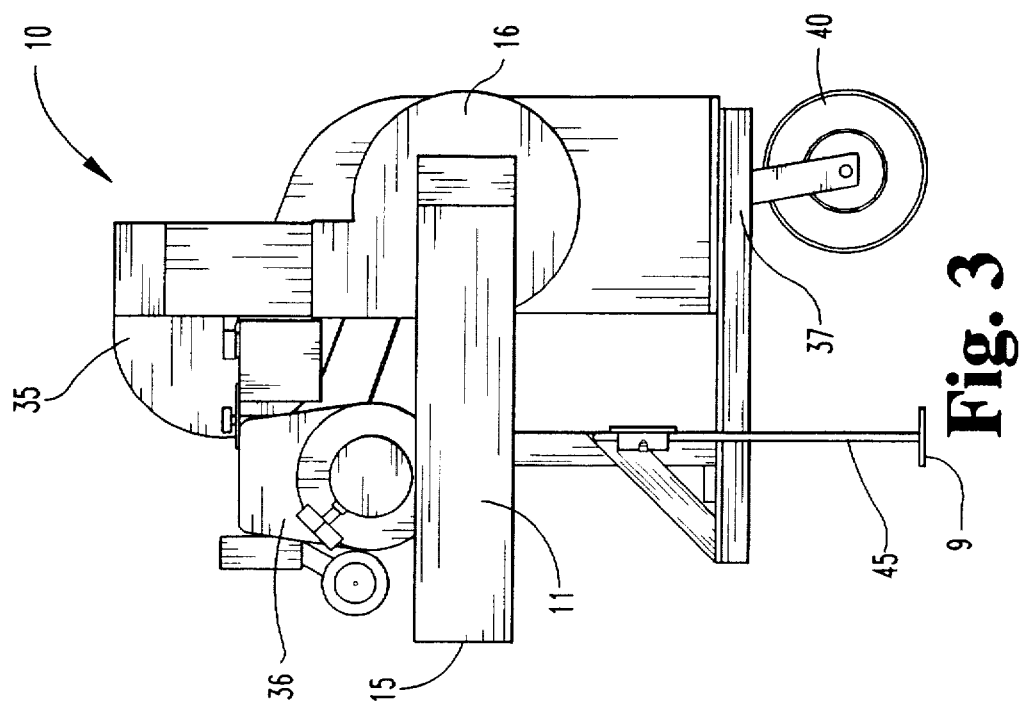
FIG. 3 is a right side elevational view of a preferred embodiment of the invention.
Figure 2:
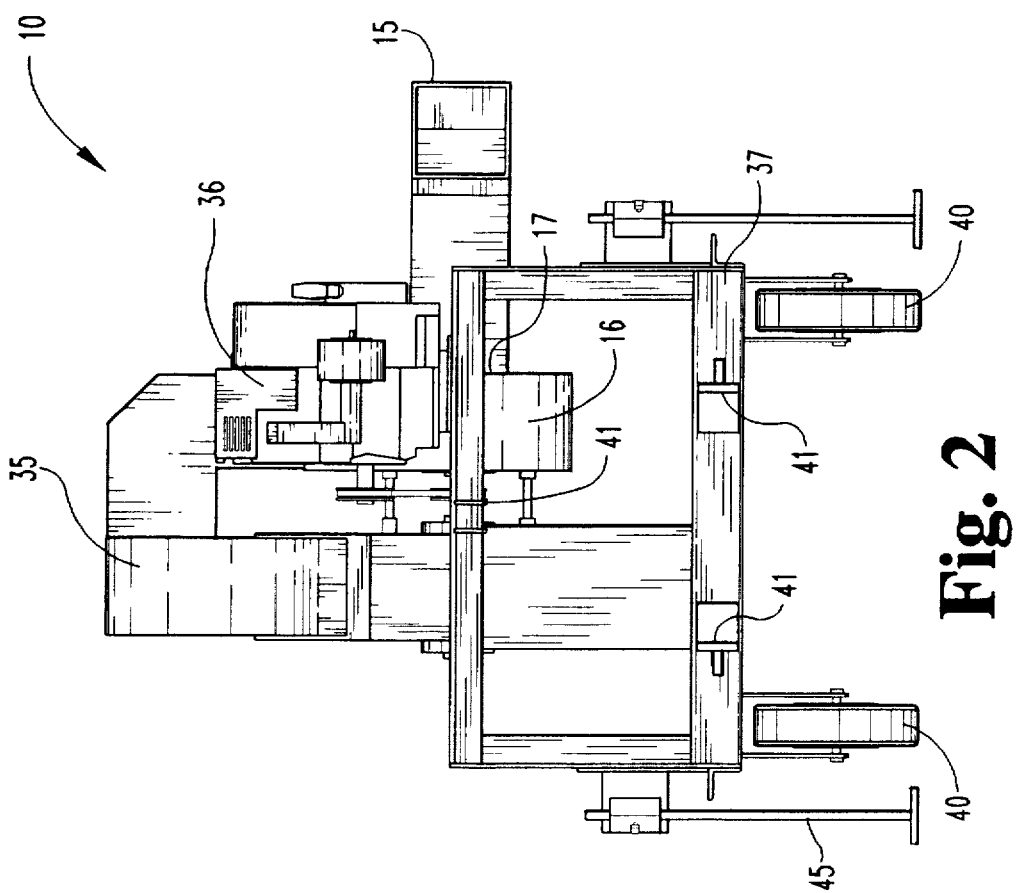
FIG. 2 is a front side elevational view of a preferred embodiment of the invention.
Figure 5:
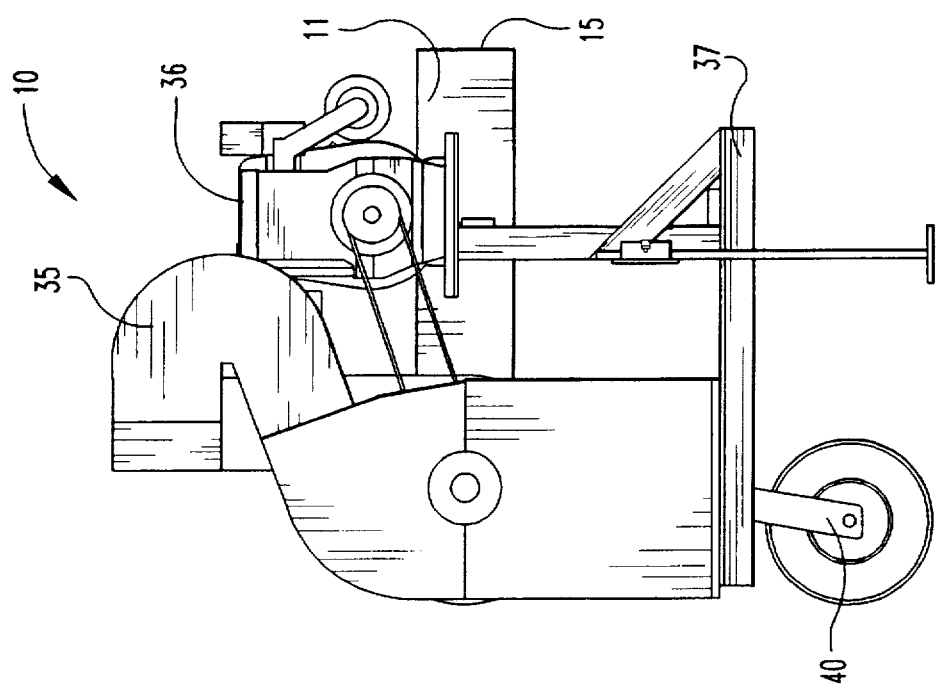
FIG. 5 is a left side elevational view of a preferred embodiment of the invention.
Figure 4:
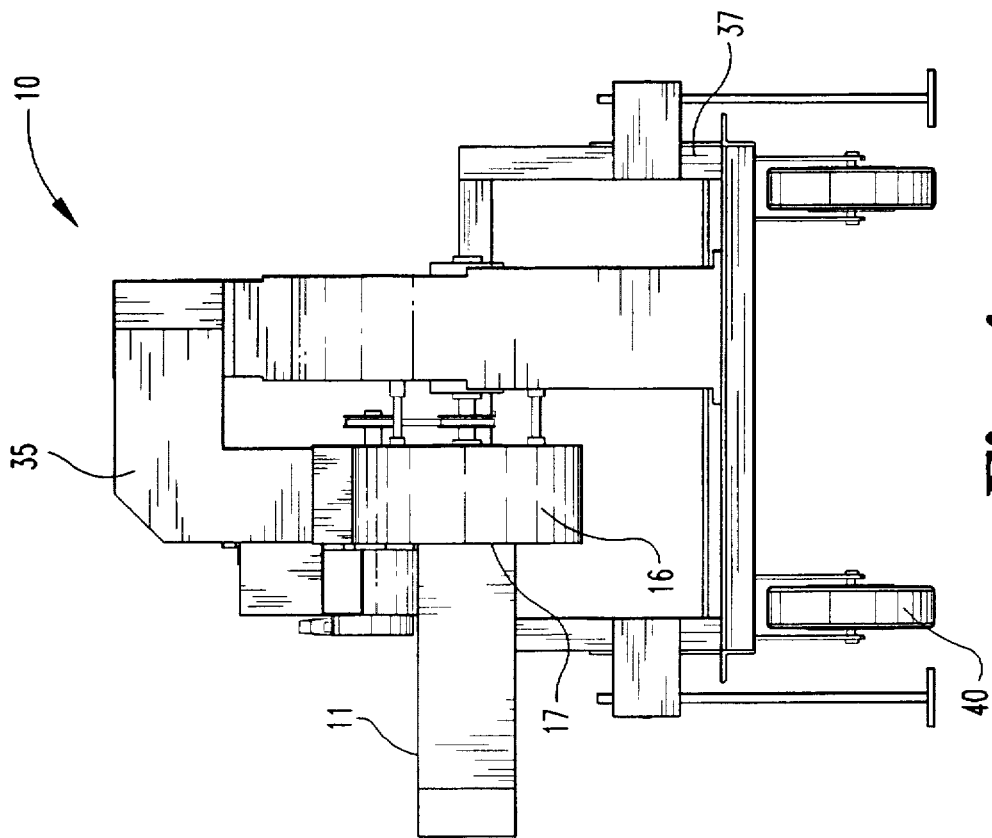
FIG. 4 is a back side elevational view of a preferred embodiment of the invention.

Referring to FIG. 2, 3 and 4, a blower 16 vacuums clipped material from a mower-deck, through the inlet duct 11, and into the inlet 17 of the blower 16. The blower 16 is preferably a centrifugal fan. A preferred impeller is of the "paddle wheel" type, and in a particularly preferred embodiment, the impeller is about 10 inches in diameter and about 4 inches wide with four radial vanes positioned 90 degrees apart. The impeller is preferably made of about ¼ inch thick steel and is balanced for a preferred operational range between 3600 and 4400 revolutions per minute. This design serves to at least partially shear the clippings as they pass through the rotating impeller in addition to the function of providing a vacuum to pull the clippings from the mower-deck and then blow them downstream of the blower, into the next unit operation of the apparatus.

Figure 6:
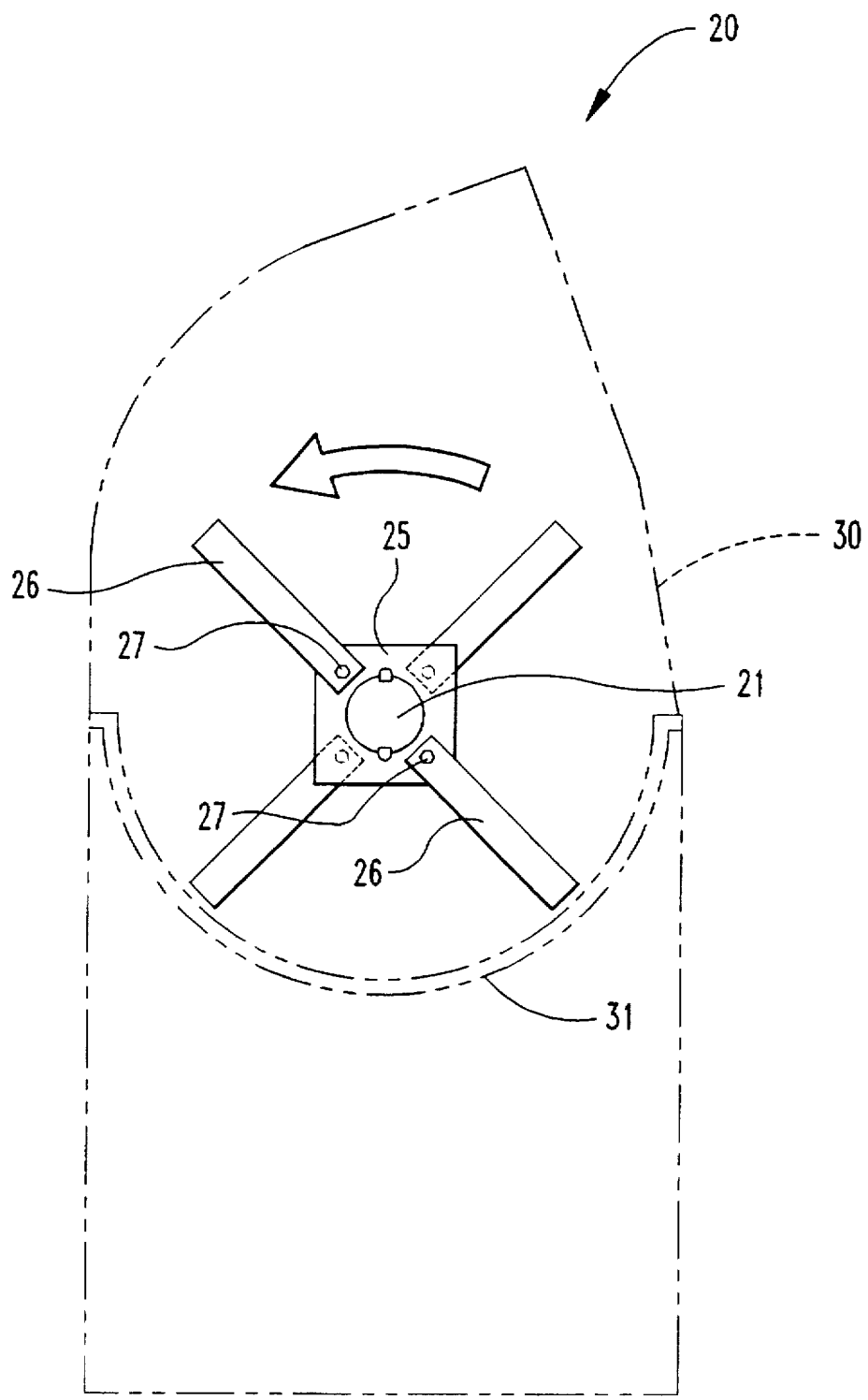
FIG. 6 is a cross-sectional view of a hammer mill preferably used in this invention.

Referring again to FIG. 1, a hammer mill 20 is preferably downstream of the blower 16. An internal cross-sectional view of a preferred hammer mill 20 is shown in FIG. 6. A preferred hammer mill 20 typically comprises a rotating shaft 21 with a plurality of spacer plates 25 over its length. These spacer plates are shown as square; however, other centrifugally balanced shapes are usable such as circles or certain ovals. Preferably at least two free-swinging hammers 26 are mounted on each spacer plate with pins 27, and more preferably at least four free-swinging hammers (not shown) are mounted on each spacer plate. The hammers are situated in a staggered fashion to insure that at least one hammer continually strikes over the screen 31, located at the outlet of the hammer mill. The shaft 21 is mounted inside the housing 30 with bearings (not shown) that allow the shaft and hammers to rotate at high speed, preferably, between 3600 to 3800 revolutions per minute. At these speeds, the hammers finely slice and chop grass, leaves, sticks, and other debris. The screen 31 allows only those materials that have been finely chopped to exit the hammer mill and fall to the ground. Examples of preferable mesh sizes of this screen include 1¼ inch and ¾ inch. Hammer mills of this or similar design are commercially available from such sources as The C. S. Bell Co. in Tiffin, Ohio. For mower-deck's up to 32 inches wide, typically a 6 inch wide hammer mill is preferable with at least 12 hammers, but is more preferable with 24 hammers. For mower-deck s between 32 inches to 48 inches wide, typically a 9 inch wide hammer mill is preferable with at least 18 hammers, but is more preferable with 36 hammers. For mower-deck's between 48 inches and 72 inches wide, typically a 12 inch wide hammer mill is preferable with at least 24 hammers, but is more preferable with 48 hammers. In all cases, a preferable hammer is about 4 inches long and constructed with 3/16 inch or ¼ inch thick hardened steel.

Referring to FIG. 1, 2, 3, 4 and 5, an interconnecting duct 35 connects the outlet of the blower 16 to the entrance of the hammer mill 20. The interconnecting duct 35 serves to direct clippings from the blower 16 into the hammer mill 20 for final mulch preparation. This duct is shown with a square cross-section; however, other cross-sectional shapes are usable such as a round or an oval cross-sectional duct.

A motor 36 is used to power the blower 16 and the hammer mill 20. The motor is typically a 10 horsepower air-cooled 4-cycle gasoline engine, commercially available from such sources as Northern Hydraulics Catalog or purchased from any dealer that handles Tecumseh motors (model "HM 100"). The motor is mechanically connected to the shaft of both the blower 16 and the hammer mill 201, preferably with a belt drive. Also preferable and as shown, the hammer mill 20 and the blower 16 share a common drive shaft that is powered by the motor 36. However, the motor 36 can also be replaced by a gear box. In this alternative preferred embodiment, the gear box (not shown) is mechanically attached to the blower 16 and the hammer mill 20 in the approximate location as the motor might reside. The gear box is then driven by a power take-off, preferably via a shaft, from the tractor that pulls the mulching apparatus. Accordingly both the gear box and the mower are two preferred means for providing power to the blower 16 or the hammer mill 20.

A cart or wagon 37 is preferably used to pull the blower 16 and the hammer mill 20 behind a riding lawn mower or tractor. The cart or wagon is preferably formed from ¼ inch thick, 2 inch×2 inch angle iron with at least two 10 inch diameter swivel pneumatic casters 40. A three-point hitch 41 is preferably used to couple the cart or wagon to a tractor or a riding lawn mower; however, a standard ball or hook hitch is also contemplated. Stands 45 are preferably used to hold the apparatus when not coupled to a tractor.

Figure 7:
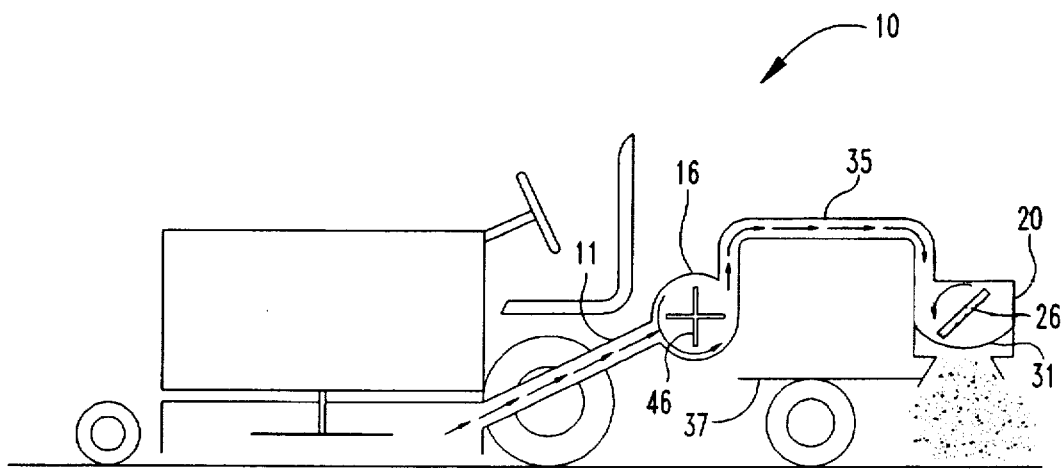
FIG. 7 is a block diagram of a preferred embodiment of the invention.

When in operation, referring to FIG. 7 apparatus 10 intakes the clippings of grass, leaves, sticks, or similar debris from the mower-deck of a lawn mower or a tractor. These clippings are directed into the inlet duct 11 where they are vacuumed into the suction side of the blower 16. While in the blower, at least a portion of these clippings are reduced in size by contact with the rapidly rotating impeller 46 within the blower 16. The clippings are then blown from the blower through the interconnecting duct 35 into the hammer mill 20. Once in the hammer mill, the clippings are continually, finely cut and chopped by the hammers 26 within the hammer mill 20. Only until a substantial portion of the clippings are reduced to a mulch, does the mulch exit the apparatus 10 by being discharged from the hammer mill 20. Upon discharge, they are dropped on the ground behind the apparatus, but could be alternatively bagged. The process preferably operates continually as the riding lawn mower or tractor is being used.

Figure 8:
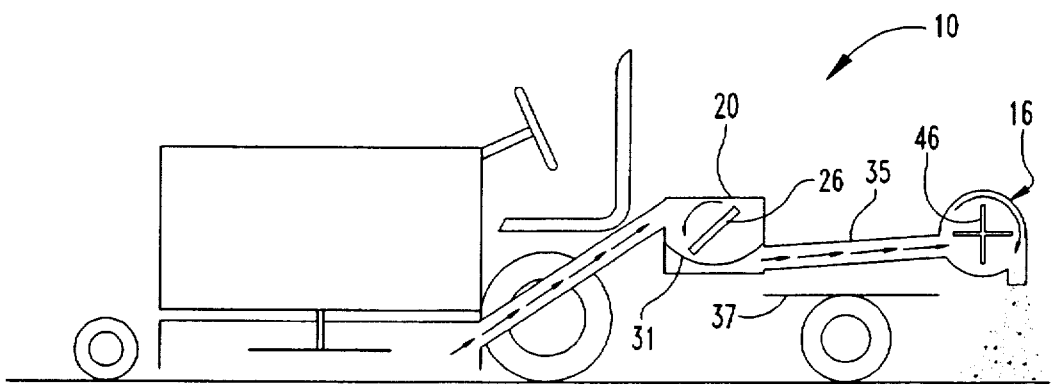
FIG. 8 is a block diagram of another preferred embodiment of the invention.

While the invention has been illustrated and described in considerable detail with the aid of drawings, both the discussion and the drawings are to be considered as illustrative and not limiting in character. For example, the blower may be positioned downstream of the hammer mill with sufficient vacuum force to draw the clippings through the hammer mill and into the blower for discharge as shown in FIG. 8. It must be understood that only preferred embodiments are shown and described, and that all changes and modifications that come within the spirit of the invention are protected by this patent.

What is claimed:

1. A mulcher for a lawn mower with a mower-deck, comprising:
   (a) a blower having an inlet and an outlet;
   (b) a hammer mill located downstream of the mower-deck and having an entrance and an exit;
   (c) an inlet duct to guide grass clippings from said mower-deck and through said hammer mill and said blower;
   (d) an interconnecting duct between said blower and said hammer mill; and
   (e) a power source that is mechanically coupled to drive said hammer mill.

2. The mulcher of claim 1, wherein said hammer mill and said power source are fixedly mounted to a frame.

3. The mulcher of claim 1, further comprising a wagon upon which said blower, said hammer mill, and said power source are mounted, said wagon having at least two wheels.

4. The mulcher of claim 3, further comprising a three-point hitch for attaching to said lawn mower.

5. The mulcher of claim 1, wherein said hammer mill and said blower share a common drive shaft.

6. The mulcher of claim 2, wherein said power source is a single gasoline motor.

7. The mulcher of claim 2, wherein said power source is a gear box adapted to connect to a power take-off of the lawn mower.

8. The mulcher of claim 1, wherein said blower is a centrifugal fan.

9. The mulcher of claim 1, wherein said centrifugal fan has a paddle-wheel type impeller.

10. The mulcher of claim 1, wherein said hammer mill contains hammers made of hardened steel.

11. An apparatus for preparing mulch, comprising:
    (a) a tractor with a mower-deck, wherein said mower-deck has at least one rotatably mounted cutting blade;
    (b) a powered blower having an inlet and an outlet;
    (c) an inlet duct adapted to guide grass and leaf clippings from said mower-deck and into the inlet of said blower;
    (d) a powered hammer mill located downstream of said blower and having an entrance and an exit;
    (e) an interconnecting duct fixedly mounted between said blower and said hammer mill.

12. The apparatus of claim 11 wherein said hammer mill is mounted to a frame.

13. The apparatus of claim 11, further comprising a wagon upon which said blower and said hammer mill are mounted, said wagon having at least two wheels.

14. The apparatus of claim 13, further comprising a three-point hitch for attaching said wagon to said tractor.

15. The apparatus of claim 11, wherein said hammer mill and said blower share a common drive shaft.

16. The apparatus of claim 11, further comprising a gasoline motor to drive said blower and said hammer mill.

17. The apparatus of claim 11, further comprising a gear box adapted to connect to a power take-off of said riding lawn mower with said hammer mill.

18. A method for preparing mulch from grass, leaves, sticks, or similar debris, comprising the steps of:
    (a) cutting the grass, leaves, sticks or similar debris with a lawn mower whereby clippings are formed;
    (b) blowing said grass clippings from the discharge of said lawn mower into the entrance of a hammer mill utilizing a centrifugal fan;
    (c) pulverizing said grass clippings into a mulch with said hammer mill; and
    (d) discharging the mulch from said hammer mill.

19. The method of claim 18, wherein said lawn mower is a tractor with a mower-deck having at least one rotatably mounted blade.

* * * * *